United States Patent [19]

Loznak et al.

[11] 4,015,872
[45] Apr. 5, 1977

[54] IMPALING TRANSFER PROCESS AND APPARATUS

[76] Inventors: Edward J. Loznak, 306 E. Park, St. Johns, Mich. 48879; Eugene L. Wood, 6785 Telegraph Road, Birmingham, Mich. 48010

[22] Filed: June 25, 1975

[21] Appl. No.: 590,049

[52] U.S. Cl. .............................................. 294/61
[51] Int. Cl.² ....................................... B08B 1/00
[58] Field of Search ........ 214/1 BB; 294/61, 86 R; 198/131, 197; 221/214–216

[56] References Cited

UNITED STATES PATENTS

| 2,804,336 | 8/1953 | Thompson | 294/61 |
| 3,583,698 | 6/1971 | Morton | 294/61 |

FOREIGN PATENTS OR APPLICATIONS

| 1,481,870 | 6/1949 | Germany | 294/61 |

*Primary Examiner*—Stanley H. Tollberg
*Attorney, Agent, or Firm*—Miller, Morriss and Pappas

[57] ABSTRACT

A process and apparatus to lift, transfer and position penetrable stock such as resin, fabric, and filled or laminated material by impalement. One or more spearhead elements are driven through the penetrable material. The spears are turned axially and lifted to lift the penetrable material with the spears and present it to a work surface whereupon the spear is again turned or rotated, aligning the barbs or flukes so that a stripper plate easily strips the stock from the spearheads and onto a suitable work surface such as a die. The apparatus comprises one or more quills and each supports a harpoon-like spearhead in an adjustable support. A stripper plate in clearance relation with respect to the flukes of the spearhead is movable independently of the spearhead so that when the spearhead mimicks its entry postion, the stripper plate moves in the direction of the spearhead and forces the penetrable stock off of the harpoon points or spearheads and onto a work surface. The spearhead elements and stripper may be restricted to reciprocal movement such as up and down movement so that templets bearing the stock and dies receiving the stock are movable in a shuttle fashion to unload and load position beneath the spearheads or the spearheads and stripper structure may be movable laterally to a pick-up station and then laterally to a discharge or die loading station where the work surface receives the penetrable stock.

7 Claims, 10 Drawing Figures

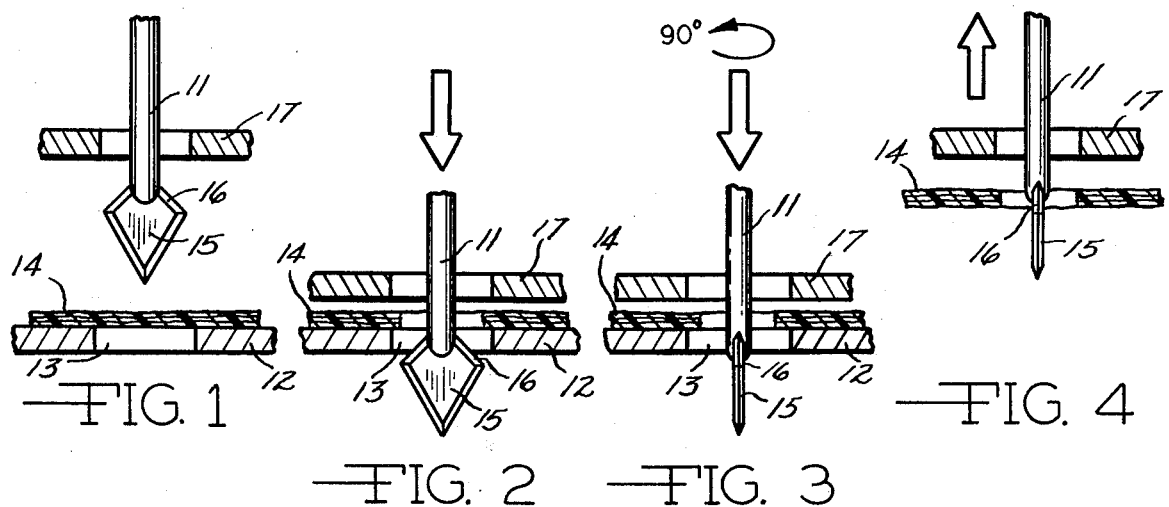
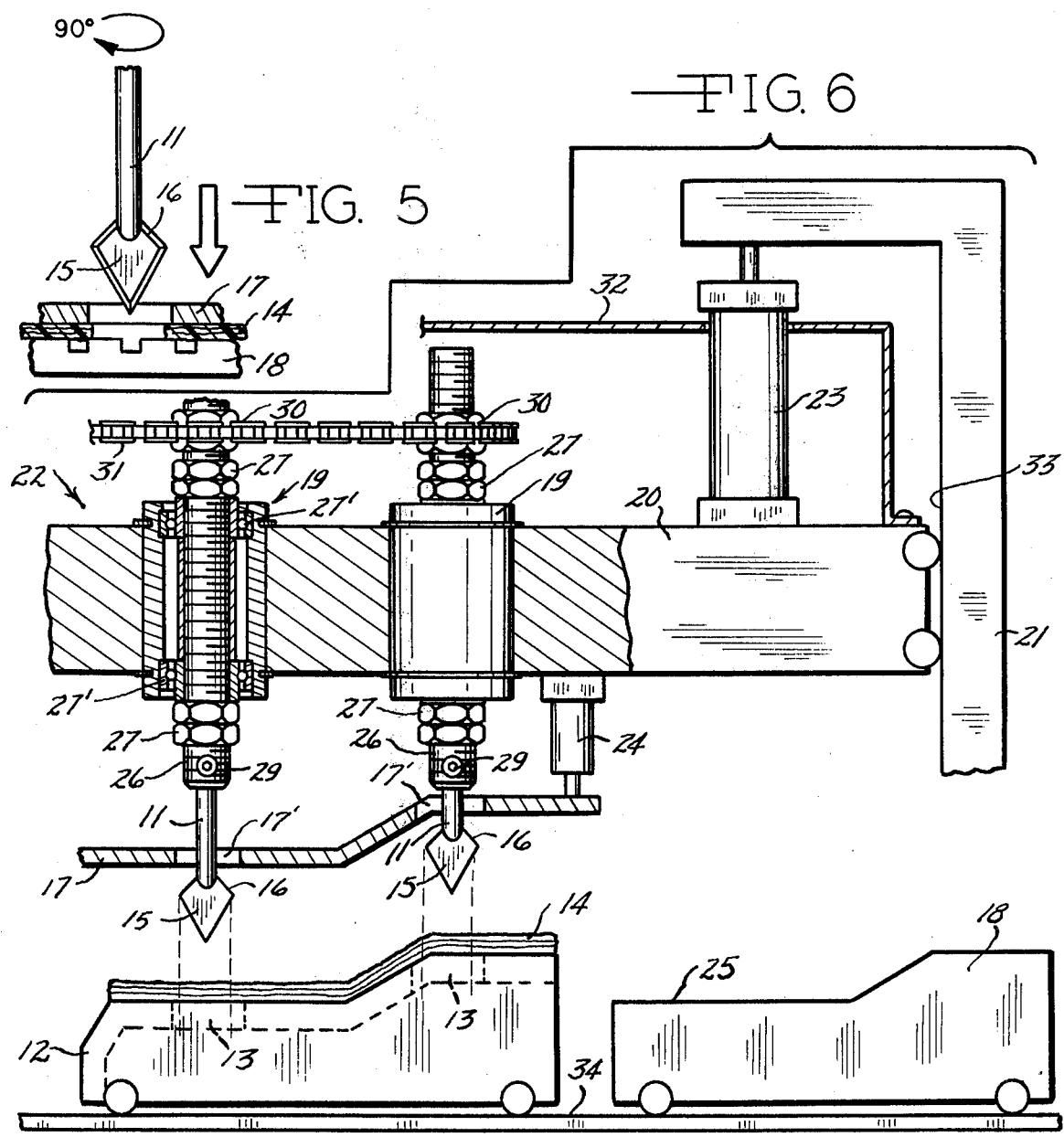

IMPALING TRANSFER PROCESS AND APPARATUS

The present invention comprises a method and apparatus for lifting, transporting and orienting penetrable stock as fabric, resin, and filled and laminated stock so as to accomplish proper orientation of such resin impregnated or fiber filled resin material in dies and fixtures in an automatic or semiautomatic manner. The invention is addressed primarily to the manipulation of sheet molding compounds comprising limber resin impregnated sheets or mats in laminated or filled form in which the fill material may be fabrics, rovings, or woven stock and in which the resins may be thermoplastic or thermosetting but in penetrable strip or sheet preforms.

In the forming of principal automotive shapes and forms, such as body sections, fenders, hoods, instrument panels, grills, and the like, there are increasing advantages in weight, strength and amenability to repairs in using resin or plastic materials. Such devices integrate fastening and support projections. However, production has been substantially limited in resins and plastics because of the heavy requirement for hand lay-up, lamination, and manipulation prior to entry to the presses. In fact, in many instances, the loading of dies with laminar and gel coats has frequently been done in the presses and between the platens thereof by persons walking into the presses to get to the molds in violation of all principal safety requirements for presses. The result has been extremely limited production under high hazard conditions with consequent high cost. Under such circumstances, only limited use of resins in auto body work has been seen. The limber sheet-like molding compounds had to be carried into the presses and carefully draped in strips or mats on the molds prior to closing the dies or molds and forming and curing. An important advance was made when resins were formulated and filled, as with chopped rovings, and were thus formed in sheets or strips which were easily cut and placed between tooling elements and finally cured and formed by the action of the pressure and heat in the presses. The real remaining problem was how to get the lay-ups into the press without allowing persons to get between the press platens or between die or mold halves.

The present invention has as its principal object the elimination of the need for the manual carrying into the presses of penetrable sheet or mat material.

Another object is to extend the concept of material handling to include impalement of the stock in which there occurs the penetration of penetrable stock as by spears or harpoons and then by lifting the stock and the harpoons or spears supported by flukes or barbs to effectively transport the composite mats of plastic or resin impregnated and filled material to the dies and from a preform or preliminary lay-up of the mat under easy access to curing-ready condition in or on the finish dies or work surfaces and without human intervention from the point of loading the preform template.

Another object is the provision of an impalement process applicable to transfer of penetrable stock so as to bring automation to resin molding procedures where sheet molding compounds in the form of mats are used.

Another object is to provide apparatus combining one or more quills containing adjustable spearheads operating with stripper apparatus to be used in varied die or mold applications as required by the job application.

Other objects including simplicity and simplification of transfer apparatus and manipulating structures with consequent labor saving will be apparent to those skilled in the art as the description proceeds.

IN THE DRAWINGS

FIG. 1 is a partial side elevation showing a spear with a fluked spearhead poised above a sheet of penetrable stock and the stock positioned on a template table with perforations therethrough allowing penetration of the spearhead. The stripper is raised and poised in clearance relation around the shank of the spear.

FIG. 2 is a partial side elevation view showing the spear of FIG. 1 and stripper moving downward and penetrating the sheet stock and entering the clearance openings in the template.

FIG. 3 is a partial side elevation view showing the spear in the position shown in FIG. 2 and in which the spear has been turned on its axis so that the flukes of the spearhead are misaligned with the line of penetration.

FIG. 4 is a partial side elevation of the invention and shows the structure as shown in FIG. 3 elevated to lift the impaled stock free of the loading template or table and the stock resists dropping off of the spearhead by the impingement of the stock on the flukes.

FIG. 5 is a partial side elevation view of the structure seen in FIG. 4 with the spearhead elevated but now oriented and poised over a die or mold surface or cavity and with the stripper activated after the spearhead has been turned to realign the spearhead and flukes with the stock penetration line, thereby depositing and pressing the stock on the molds or in the dies remote from the loading template.

FIG. 6 is a partial side elevation section view showing a plurality of spear supporting quills with sprocket and chain drive means to rotate the spears on their axes simultaneously and with a double acting cylinder or fluid motor raising and depressing the quill carriage and showing a separate double acting cylinder or fluid motor selectively operating the stripper as desired. Beneath the quills is shown a loading template and a separate die or mold surface over which said quills are selectively positioned and actuated so as to move stock from the template to the die or mold.

Figure 7:
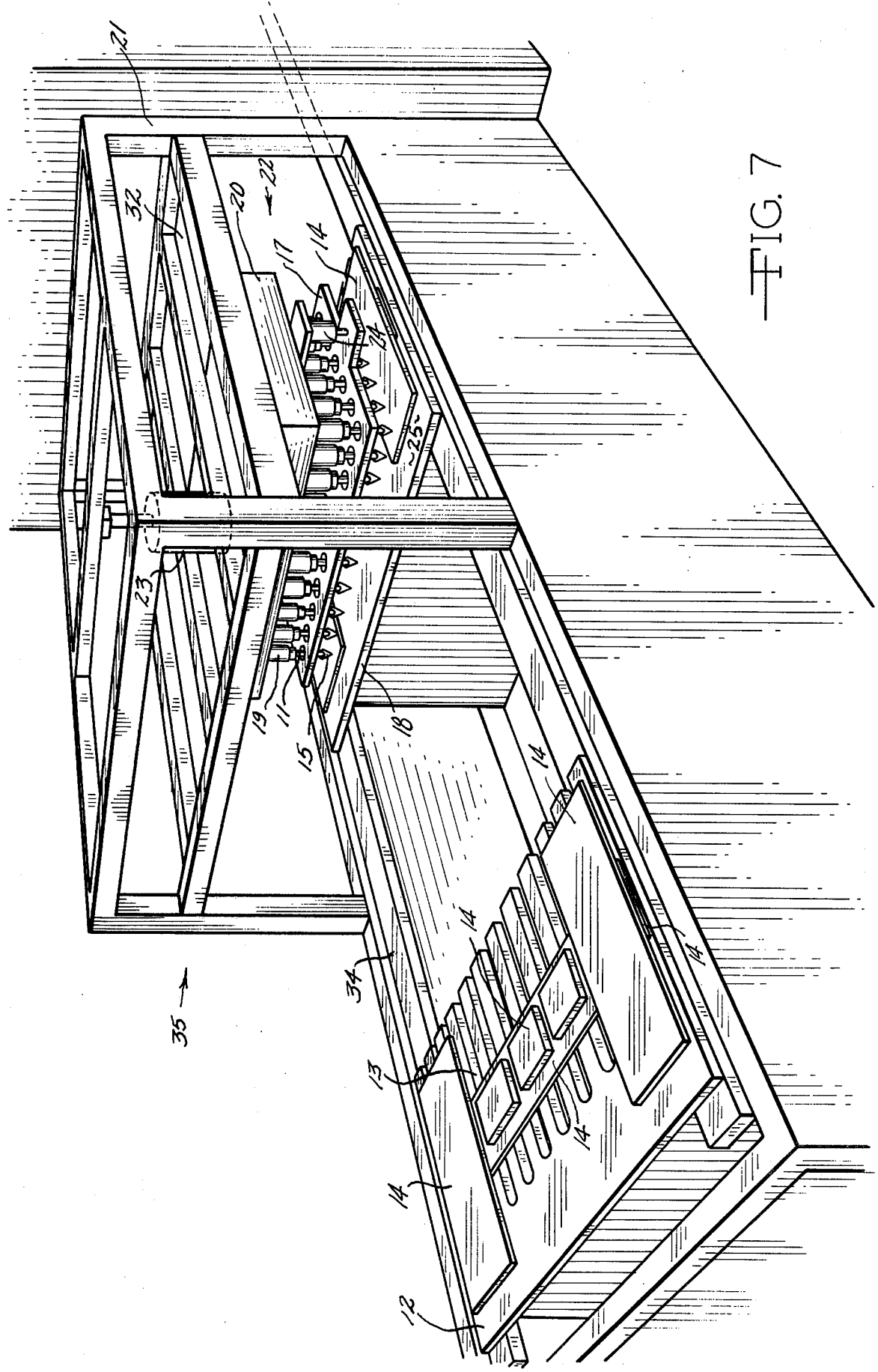

FIG. 7 is a somewhat schematized perspective view of a transfer apparatus in accord with the present invention and using a shuttle loading system for loading a die or mold half that is substantially moved laterally into an adjacent press.

Figure 8:
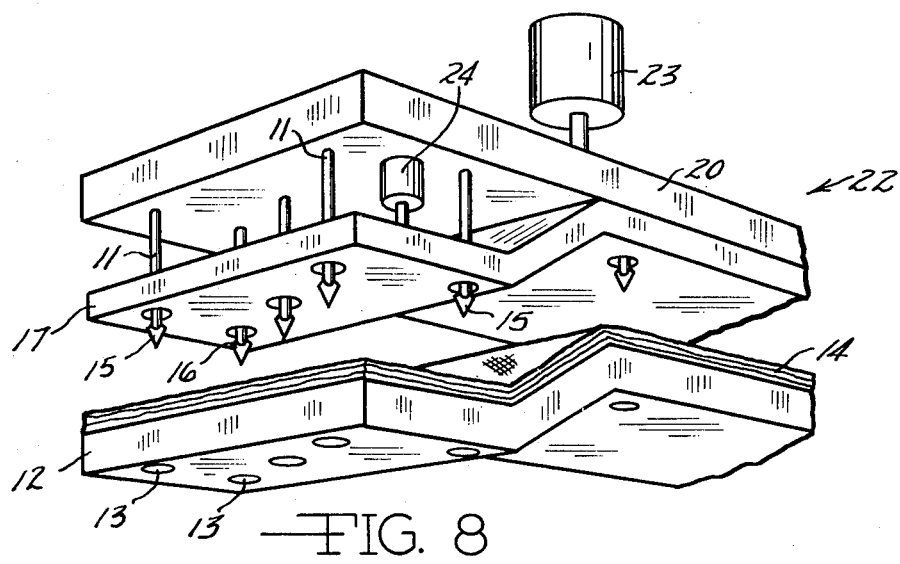

FIG. 8 is a schematized perspective view of spears, spear carriage and stripper poised above a penetrable template upon which sheets of penetrable stock are selectively assembled.

Figure 9:
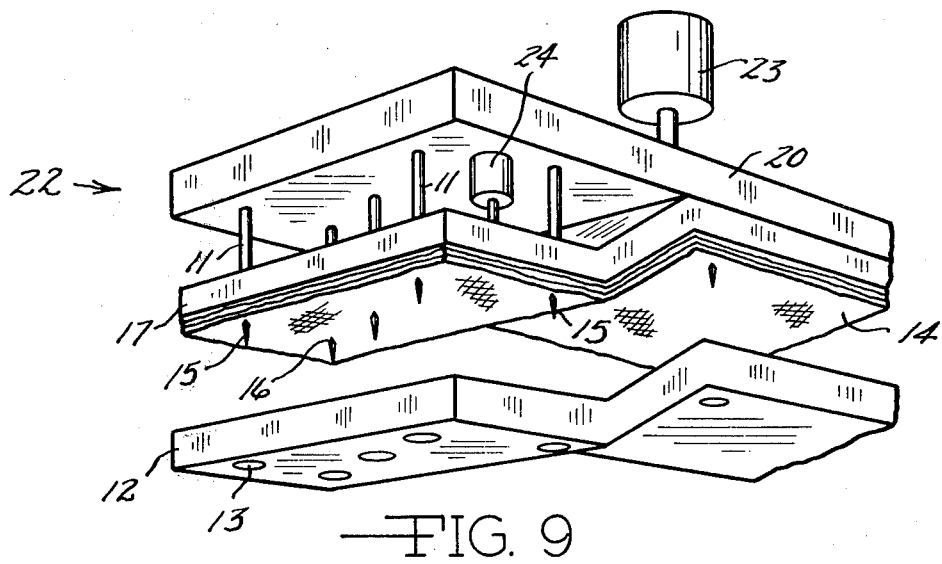

FIG. 9 is a perspective view which illustrates the same structure as in FIG. 8 but the spearheads have closed on the stock, penetrated it, turned the flukes or blades of the spearheads to a position transverse to the entry condition and thus lifted the stock clear of the loading table.

Figure 10:
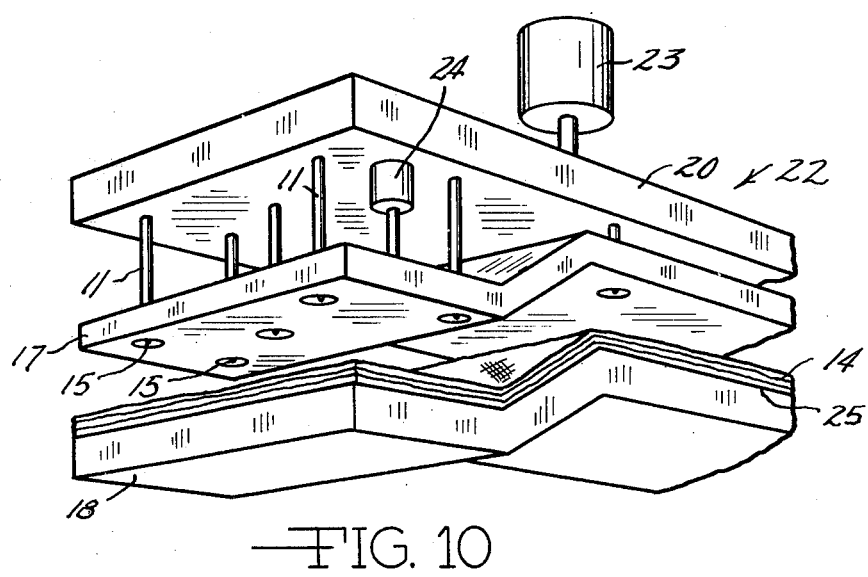

FIG. 10 is a perspective view as in FIG. 9 where the carriage structure is positioned above an open mold or die and the stripper is activated so that the stock has been disengaged from the harpoon or spearheads and has been deposited and positioned on the work surface.

GENERAL DESCRIPTION

In general, the process and preferred apparatus of the present invention is best characterized to involve the concept of penetrating a sheet of penetrable resin, fabric, resin filled or resin fabric laminate with spears which are barbed or fluked and harpoon-like inasmuch as the spears or harpoons are driven forcibly through the relatively limber sheet stock so that the barbs or flukes protrude beyond the lower surface of the stock. The consequence is an impalement of the stock and the stock thus impaled may be lifted and transported as desired and in combination with a stripper the penetrable stock is selectively dropped and pressed on or in a work surface such as a die or mold surface located in a press or movable from the loading station into a press. After such deposit by the methods and apparatus herein the molds or dies close on the material or stock and the press squeezes and cures the material into the fender, grill or automobile body section as required. Surplusage of resin appears in flashing which is trimmed away and high quality finish molding results strengthened by the filler formulation, the fabric laminates or the structural shape.

Collaterally, the placement of the materials for impalement does not require great precision and the limber sheets or strips of stock are merely positioned on rough perforated templates conforming generally to the dies or molds at a station remote from the press and preliminary to impalement, pick-up and transfer. Thus, the process of the invention is characterized as the positioning of an impaling structure above a template loaded with penetrable material and then driving the impaling structure through the stock or material so that the barbs or flukes penetrate the sheets. The sheet and strips of material are thus impaled securely. The barbs or flukes are so oriented (as by burning or extending and expanding) that as the impaling structure is then elevated, it lifts the stock or material with it for manipulation, reorientation and ultimate depositing or draping on mold or die work surfaces. The deposition of the sheet material on the work surfaces is done by a stripper which acts between the impaled stock and the impaling structure to disengage the material when satisfactorily positioned over the work surface. The stripper presses the stock onto the work surface. By moving the impaling structure, the stock may be transported or positioned on the working surface in or adjacent to a press. The template and mold or die may be made movable and selectively locatable beneath the impaling structure in the manner of a shuttle. In such instances, a single station accomplishes pick-up from a preloaded and perforated template fixture and delivery is to a die or mold element which replaces the template fixture, the latter having been removed from beneath the impaling structure for another preload. When the die is filled or loaded it may be moved into the press and there indexed and while pressure and curing progresses in the die or mold, the template is reloaded and the process is repeated. To facilitate lift and stock removal, each of the impaling elements or spears is movable as by rotation or expansion so that the flukes or barbs are moved from the weakened penetration line attending the penetration of the harpoon or spear to get a good lifting grip on the stock. This reorientation of the spearhead makes withdrawal difficult and lifting is easy. If there are a sufficient number of spears or harpoons even the original orientation of the sheets, strips, or mats on the preform template are undisturbed. When the time comes for stripping, the spears are again moved to entry position as by rotation or collapse and the resistance to disengagement is materially reduced so that the strippers cleanly remove the sheet material. The number and positioning of the impaling spears is a function of the nature of the material to be impaled, the surface configurations of the dies and molds, and the overall size of the lay-up on the template.

Viewed as an apparatus, a machine frame is provided which supports a carriage so that the carriage is selectively movable on the axis of the spears, and if it intended that the carriage be laterally movable ways are provided in a well known manner to allow selected lateral displacement of the carriage which supports the spears. The spears have barbed or fluked heads and are adjustably retained in journalled quill bodies having a central shaft which is adjustable and lockable axially and runs in thrust bearings. The upper end of the shaft is usually keyed to a sprocket and the sprockets are engaged with a chain, for example, so that action in any one of the quills can be simultaneously reflected in the action of all of the quills using an endless chain, for example, and a simple drive sprocket movable by suitable drive means to two extreme positions, i.e. the penetration oriented position of the spear and the lift oriented position of the spear. This assures that the barbs or flukes on penetration and at disengagement of material are in the same entry position but that on lift the barbs or flukes are oriented to resist removal of the penetrable sheet material.

A drive means such as a fluid motor or cylinder is connected to the frame and to the carriage so that the carriage is selectively movable up and down in the frame. The lower position is adjusted to assure that the barbs or flukes have penetrated the stock and the upper position is an elevation of the spears above the template or work surface. A stripper plate is provided around the spear shanks and above the barbs or flukes. The stripper plate is movable and the stripper plate is drivably connected to a second drive means such as a second fluid motor or cylinder of the double acting type and the drive means is also connected to the carriage. Actuation of the stripper drive means causes the stripper plate to move toward the spearheads and over the spearheads to disengage stock impaled thereon. While stripping is proceeding, the barbs or flukes are oriented to the original entry position as by rotation or collapse.

Beneath the support carriage and in the paths of the plural spears, a perforated template is first locatable and on which resin impregnated sheets have been placed or draped in an oriented or preload manner. This preform template presents the stock of resin sheets to the impaling head and carriage and the spears are thereupon lowered by the carriage drive means to penetrate and impale the penetrable material. The barbs or flukes enter the perforations to fully penetrate the stock and like fishhooks, the barbs lock against withdrawal and the carriage drive lifts the thus impaled material from the template. The mold or die is positioned, then, in register beneath the carriage. The barbs and flukes are restored to their entry position and the stripper moves to disengage and discharge the stock or resin material from the barbs or flukes and onto the awaiting work surface of the mold or die.

As will be appreciated, a valuable transfer of resin impregnated penetrable stock has occurred and the loaded die is then placed in the press or may be loaded in the press by the carriage moving into the press without the need for entry of persons into the press. An added benefit is that the preload template can be relatively rough and the sheets of molding compound can be easily and remotely loaded onto the template by unskilled people since the precision of placement in the template is relatively non-critical in the resin molding of body parts. Thereafter and during the manipulation, the impalement maintains the template-established orientation of the plural sheets and strips of material or stock until placement in or on the molds and dies. The flow of stock during curing and consequent flashing of surplus stock results in having ample resin at the critical positions in the dies or molds. The process and apparatus speeds resin molding and brings to the trade a wholly new concept of material transfer and manipulation for penetrable sheet or strip stock.

SPECIFIC DESCRIPTION

Referring to the drawings and with particularity to the FIGS. 1–5 thereof, the procedural and apparatus heart of the present invention is best revealed in progressive development. The spear 11 is elevated above a preform template or platform 12 which is perforated at opening 13 in registry beneath the spear 11. The platform 12 supports a penetrable sheet mat or composite of resin stock 14. Such penetrable material in mat form is called sheet molding compound and may be reinforced as by filling with glass rovings or other material or by woven fabric strip. The spearhead 15 includes barbs or flukes 16 which are sharpened as indicated at a suitable entry angle depending on the stock 14 and its composition. A stripper plate 17 is positioned above the barbs or flukes 16 and surrounds the shank portion of the spear 11 as shown. The stock 14 may be filled as with floc or beads or chopped glass rovings. In some instances where the forms developed are relatively simple, the mats of stock 14 are resin impregnated fabric. In FIG. 2 the spear 11 is driven downwardly through the penetrable stock or material 14 supported on the template 12 and through the opening 13 in the template 12 so that the barbs or flukes 16 move completely through the stock 14. The knife edges 18 on the cutting surfaces of the spearhead 15 assist the penetration. In FIG. 3 the shaft of the harpoon or spear 11 is rotated on its axis so that the barbs and flukes 16 are turned to a position transverse of the entry position as shown in FIG. 2. While not shown in the drawing, selectively retractable and expansible barbs could also be used on the spears 11 but the preferred embodiment of moving the flukes 16 as illustrated is shown. The preferred angular displacement from entry position is 90 degrees and the object of the turning is to enhance the lift-off of the stock 14 by resisting pull out. In FIG. 4 the spear remains in the position seen in FIG. 3 but is elevated and the barbs 16 thus impinge on the stock 14 and the stock 14 is lifted upward and free of the platform or template 12. Thus impaled, the stock or penetrable material 14 is presented or positioned over a working face of a die or mold 18. The spear 11 is turned to the entry position thus aligning the barbs or flukes 16 with the entry-weakened penetration place in the stock 14 and the stripper 17 is depressed as shown to disengage the stock 14 from its impaled status on the barbs 16. This places the stock 14 directly on the work surface 18 and the stripper 17 presses to material 14 to the work surface 18 and upon retreat of the stripper 17, the cycle is repeatable. While a single spear 11 is the simplest presentation of the process and apparatus of the present invention, the invention finds major application in plural groupings of spears or harpoons 11 so as to accommodate particular template lay-outs of stock and particular mold cavity configurations. Hence, it is desirable to provide height adjustments for the spears and specific means of reorienting all of the spears simultaneously and in supporting the spears 11 in the most adaptable fashion. Toward this end the spears 11 are supported in cartridges called quills 19.

By reference to FIG. 6, a pair of quills 19 are shown in side by side clamped relation on the carriage 20. The carriage 20 is movably supported in the machine frame 21 and the frame 21 is preferably of the gantry type so as to provide maximum resistance to the impaling thrust of the impaling head 22. The impaling head 22 is drivably connected to the carriage cylinder or fluid motor 23 although other well known drives such as rack and pinion are acceptable. The carriage cylinder 23 is of the double acting or reversible type and thrusts against the frame 21. A separate stripper cylinder or fluid motor 24 is drivably connected between the carriage 20 and the stripper plate 17. As will be appreciated, the stripper cylinder 24 is selectively energized to drive the stripper plate 17 downward axially of the spears 11 to strip off the stock 14 impaled on the barbs 16 of the spears 11 and to deposit it on the work surface 25 of the die or mold 18. The shafts 26 in the quills 19 are threaded and are adjustable axially to suit particularly the template 12 and die surface 25 configuration. Jam nuts 27, as shown at top and bottom of the quills 19, assure the proper setting and the quills 19 are provided, with bearings 27'122 to facilitate turning of the shafts 26 and consequent turning of the spears 11. The lower end of the shafts 26 are provided with chucks 28, each holding a spear 11 retained against independent turning by the set screw 29 and allowing for easy removal and field replacement or adjustment. The actual turning of the spears 11 to entry position and to lift position is accomplished by turning the sprockets 30 which are keyed to the shafts 26. The turning is via a continuous chain 31 which is moved selectively to a pair of extreme positions, preferably resulting in about 90 degrees of arcuate displacement of the sprockets 30. In this manner all spears 11 turn in a synchronized or simultaneous manner from entry position to lift position and return. The movement of the chains is by a motor driven sprocket (not shown) acting on the chain 31 or by linear action in any one of many well known techniques, as by cylinders, cams, solenoids or other motor means. A cover 32 may close the frame 21 at the top and is removable for access to the quills 19 and for reorientation as needed on other set-ups.

While the drive cylinders 23 and 24 are shown as single cylinder, it will be appreciated that plural cylinders as between frame 21 and carriage 20 or between carriage 20 and stripper plate 17 may be employed without departure from the spirit of the invention.

The track or way 33 provides controlled vertical reciprocation of the carriage 20, as shown. The track or way 34 provides a shuttle bed for for the positioning of movable templates 12 and die or molds 18. Where it is desirable that the impaling head 22 be laterally movable as where the template 12 is fixed at a particular location and the die or mold 18 is remotely located, then the frame 21 is movable on the ways as at 34 so as to place the impaling head 22 in suitable selected register above the template 12 and then the die or mold 18. Such a capability is clear from the drawing and description.

By reference to FIG. 7 a shuttle type set-up is illustrated in which the template 12 and the die or mold 18 are both movable and are selectively located beneath the impaling head 22 vertically operable on the ways 33 in the gantry portion 35 of the frame 21. The hidden edge lines show an extension of the ways 34 beyond the frame 21 and into position, for example, in a press (not shown) where forming and pressing occurs to shape and cure the stock 14 into a final part such as a fender, grill, hood or structural section. As previously indicated, the gantry 35 and impaling head 22 may be moved to register over the template 12 and the mold or die element 18. As actually shown in the FIG. 7, the gantry 35 is fixed in its position and the platform template 12 moves to registry beneath the impaling head 22 and the die 18 moves beneath the impaling head 22 to receive the stock 14 lifted from the template 12 by the impaling head 22 and the spears 11. Then the spears 11 are unloaded onto the die work surface 25 and are prepressed into place by the stripper 17.

FIGS. 8, 9 and 10 are partial perspective views intended to provide an operational and sequence understanding of the procedure and the apparatus described herein. These views are simplified and are somewhat schematic to reveal the functional aspects of the present invention.

In FIG. 8 the impaling head 22 is poised above the template platform 12 onto which has been loaded strips or mats of penetrable material 14 in a loose fashion and even overlapped as necessary to provide the required stacked thickness of resin stock. The template or platform 12 has been previously loaded with the stock 14 in an open environment so that the upper surface of the template 12 is easily accessible for draping placement. The cylinders 23 and 24 are fully retracted so that the stripper plate 17 is raised to expose the spears 11 and the impaling head is in its travelling position. The spearheads 15 are oriented to their entry alignment as by the sprockets 30 previously described. The placement of the quills 19 in the carriage 20 establishes the spaced pattern of the spears 11. It will also be appreciated that the patterning of the spears 11 is repeated in the perforations or openings 13 in the platform 12 and that at the extension or energization of the carriage cylinder 23 there is alignment registry as between the axes of the spears 11 and the openings 13 beneath the penetrable stock 14.

The carriage cylinder then drives the impaling head downwardly and the spearheads 15 penetrate the stock 14 by entering the openings 13. At that time the barbs or flukes 16 are oriented to lock position so as to restrain withdrawal of the spears 11 from the stock 14. This is preferably accomplished by a 90° turning of the spears 11 on their axes. When thus oriented, the impaling head 22 is retracted or raised upwardly by the action of the cylinder 23 and the impaled mat of stock 14 is raised upward as seen in FIG. 9 and off of the platform 12. The number and patterning of the spears 11 assures an adequate retention of the mat of stock 14 even where the stock 14 is in plural layers or overlapped relation in forming a composite mat.

After the lifting and moving of the stock 14 the stock 14 is registered over a work surface 25 of a die or mold 18. This is indicated in FIG. 10 and the spears 11 are then turned to their entry orientation or position so that the spearheads 15 register with the entry openings made when the spears or harpoons 11 initially penetrated the stock 14. This is accomplished as by simultaneous rotation of the sprockets 30 by chain 31 as previously described. Then the stripper cylinder or motor 24 is actuated which separates the carriage 20 from the stripper 17 and urges the stripper plate 17 over the barbs 16 and spearheads 15 to strip the stock 14 from its impaled position and deposit and press the stock 14 onto the work surface 25 of the die or mold 18. The FIG. 10 shows the stripper 17 at partial retraction toward the carriage 20 after deposition of the stock 14. Upon complete retraction achieved by the cylinder 24, the stripper 17 returns to the relative position seen in FIG. 8 ready for registry over the template 12 in preparation for another cycle of operation. As readily appreciated from the FIGS. 8, 9, and 10, the impaling head 22 may merely reciprocate upon the selected registry of first the template 12 and then the work surface 25, therebeneath. The head 22 may also travel laterally and the template 12 and work surface 25 may be fixed to provide a loading station (template 12) and an unloading station (die or mold 18). In some instances it may be desirable that the template 12 be fixed and that the die or mold 18 be movable to and from a press for example where one of the extremes of its travel locates it beneath the impaling head 22 for a charge of stock 14. Each capability is dependent upon the environment of use into which the invention is thrust.

Automatic or manual controls for actuation of the apparatus described herein forms no part of the present invention and such controls are well within the known skills of the art. Such controls have not been illustrated since they would otherwise complicate the understanding of the invention.

The flexibility of the placement of quills 19, and hence spears 11, is best understood by considering the carriage 20 as adaptable to rearrangement and in one of the simplest approaches the quills 19 are merely clamped to a selected patterning in the carriage 20.

In operation, the invention as presently described has substantially advanced the art of stock or material transfer and provides a new and useful structure for impaling, lifting, transporting and depositing or locating the penetrable stock in a wide variety of process environments. In the preparation of resin parts allowing integration of structure approaching the capabilities of injection molding but using drape techniques, the present invention brings the resins further along toward faster productivity.

Having thus described our invention and several modifications and adaptations thereof, those skilled in the arts of material handling and transfer will readily perceive improvements, modifications and adaptations thereof and such improvements, modifications and adaptations in structural and process senses, within the skill of the art, are intended to be included herein restricted only to the scope of the hereinafter appended claims.

We claim:
1. A process for the transfer of blanket-like penetrable material including the following steps:
positioning an impaling structure above said material;
driving said impaling structure to penetrate said material and orienting by rotating the impaling structure to a position transverse of entry to resist withdrawal from said material;

elevating said impaling structure whereby said material is lifted and carried with said impaling structure;

orienting said impaling structure above a work surface while reorienting the impaling structure by rotation to a position registrable with the entry to allow material withdrawal and stripping said material from said impaling structure to disengage said material therefrom and drop said material onto said work surface.

2. A transfer process for penetrable stock comprising the steps of:

placing sheets of penetrable material on a template;

positioning said template beneath a plurality of spears and driving said spears through said penetrable material;

turning said spears on their axes;

lifting said spears and said material impaled thereon from said template;

transferring said material to a position over a working surface and turning said spears on their axes to impaling entry position;

stripping said material from said spears and onto said working surface; and repeating said operational sequence.

3. An apparatus for piercing, lifting and transferring penetrable material comprising:

a machine frame;

one or more spears in parallel spaced-apart relation;

drive means connected to said spears for selected axial reciprocal rotation of said spears;

a support carriage holding said spears;

drive means connected to said frame and to said support carriage whereby said carriage is selectively and reciprocably driven on the axis of said spears;

a stripper plate surrounding the shank portions of said spears in clearance relation thereto and movable with said carriage; and drive means connected to said carriage and to said stripper plate whereby said stripper plate is movable on the axis of said spears and disengaging material from said spears.

4. In the combination of claim 3 wherein said frame includes shuttle means and a perforated template thereon for location of said template beneath said support carriage and at a drape loading station; and a work surface also on said shuttle means and positionable selectively beneath said carriage and movable to a work station.

5. In the combination of claim 3 wherein said carriage is laterally and selectively movable in said frame from a first position over a perforated template to a second position in registry over a work surface upon which said stock is deposited.

6. An apparatus for penetrating, lifting and transferring penetrable stock comprising:

an impaling head including a carriage and a plurality of spear support quills selectively locatable on said head;

a machine frame supporting said impaling head and said carriage;

fluked spear elements adjustably and removably supported in said quills;

means connected to the shafts of said quills selectively rotating said spear elements to two positions;

a drive element drivably connected to said frame and to said carriage whereby said carriage is selectively lowered and raised in respect to said frame;

a stripper reciprocably and selectively movable axially of said spear elements; and a drive element drivably connected to said stripper and to said carriage whereby said stripper is selectively movable on the axis of said spears for removing stock impaled on said spears.

7. In the combination of claim 6 and including means laterally moving said carriage to a first registry position over a pick up template station and to a second registry position over a work station upon which said impaled stock is deposited.

* * * * *

UNITED STATES PATENT OFFICE
CERTIFICATE OF CORRECTION

Patent No. 4,015,872             Dated 1977 April 5

Inventor(s) Edward J. Loznak, Eugene L. Wood

It is certified that error appears in the above-identified patent and that said Letters Patent are hereby corrected as shown below:

Column 1, Referenced Cited (German Patent), "6/1949" should read --- 6/1969 ---

Column 6, line 34, delete "122" after --- 27' ---

Signed and Sealed this

Twenty-eighth Day of June 1977

[SEAL]

Attest:

RUTH C. MASON
Attesting Officer

C. MARSHALL DANN
Commissioner of Patents and Trademarks